United States Patent [19]
Kowdley et al.

[11] Patent Number: 5,930,316
[45] Date of Patent: Jul. 27, 1999

[54] SHROUD SUPPORT ULTRASONIC EXAMINATION APPARATUS

[75] Inventors: Balasubramanian Srikantiah Kowdley; Henry Alexander Points; Ronald E. Lindeman, all of San Jose, Calif.

[73] Assignee: General Electric Company, Schenectady, N.Y.

[21] Appl. No.: 09/086,653

[22] Filed: May 29, 1998

[51] Int. Cl.[6] .................................................. G21C 17/01
[52] U.S. Cl. ............................................................ 376/249
[58] Field of Search .................................... 376/245, 249, 376/252, 260, 302

[56] References Cited

U.S. PATENT DOCUMENTS

| | | | |
|---|---|---|---|
| 5,295,167 | 3/1994 | Burner | 376/260 |
| 5,787,137 | 7/1998 | Nelson, III et al. | 376/249 |

*Primary Examiner*—Daniel D. Wasil
*Attorney, Agent, or Firm*—Armstrong Teasdale LLP

[57] ABSTRACT

Methods and apparatus for examining a nuclear reactor shroud are described. In one embodiment the inspection apparatus includes an elongate tubular upper section, an elongate middle section, an elongate lower section, and a scanner arm assembly movably coupled to the middle section. The inspection apparatus is configured to be inserted into the reactor pressure vessel through one of the openings in the reactor core plate. The upper section includes a bail handle and an indexing ring having an alignment lug, a plurality of slots and a movable locking tab configured to engage the slots. The lower section includes a rotary bearing located at the bottom end. The lower section is configured to engage and rest on a control rod drive housing. The middle section includes a movable door and a movable traveler plate movably coupled to the scanner arm assembly. The scanner arm assembly includes a fixed track, a movable track, a scanner carriage, and a scanner array.

27 Claims, 6 Drawing Sheets

SHROUD SUPPORT ULTRASONIC EXAMINATION APPARATUS

FIELD OF THE INVENTION

This invention relates generally to nuclear reactors and more particularly, to methods and apparatus for examining a shroud within such reactors.

BACKGROUND OF THE INVENTION

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide.

Boiling water reactors have numerous piping systems, and such piping systems are utilized, for example to transport water throughout the RPV. For example, core spray piping is routed over and through the shroud to deliver water to the reactor core.

Intergranular Stress Corrosion Cracking (IGSCC) is a known phenomenon occurring in reactor components, such as structural members, shrouds, piping, fasteners, and welds, exposed to high temperature water. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to IGSCC.

Over the life of the reactor, the shroud, shroud support, baffle plate, shroud support legs and the attachment welds situated in the reactor are susceptible to various types of cracking due to the hostile nature of the environment in the reactor. It is important to examine these components periodically to determine whether any cracking has occurred. Furthermore, in cases where major repair and refurbishment is undertaken in the reactor, such as shroud replacement, it is important to know if the components that are not being replaced, such as components that support the shroud, are free of cracks.

While examinations in the annulus, or region between the shroud and the pressure vessel wall, can be performed, these examinations are likely to be only partial inspections due to access limitations in the annular region of the reactor. Any examination in the annulus is hampered by the numerous components such as jet pumps and further constrained by any shroud repair hardware present in the annulus. Thus, it is highly advantageous to perform the examination of the components from the inside of the shroud cylinder.

It would be desirable to provide an inspection tool that is capable of performing ultrasonic examinations of shrouds and shroud components from within the shroud cylinder in a nuclear reactor. It would also be desirable to provide an inspection tool that is remotely operable and capable of providing position information relative to fixed items within the reactor.

SUMMARY OF THE INVENTION

These and other objects may be attained by a remotely operable inspection apparatus that can perform ultrasonic examinations of a nuclear reactor shroud, and more particularly, the shroud support from within the shroud cylinder of the nuclear reactor. The inspection apparatus includes an elongate tubular assembly and a scanner arm movably coupled to the tubular assembly. The elongate tubular assembly includes an elongate tubular upper section, an elongate tubular middle section coupled to the upper section, and an elongate tubular lower section coupled to the middle section. The scanner arm assembly is coupled to the middle section. The inspection apparatus is configured to be inserted into the reactor pressure vessel through one of the openings in the core plate.

An indexing ring is coupled to the upper section of the inspection apparatus. The indexing ring enables the apparatus to be orientated radially so that the scanner arm assembly is aligned properly with the shroud. The indexing ring includes a plurality of slots configured to receive a locking tab for locking the apparatus in the proper orientation. The indexing ring also includes an alignment lug that is configured to engage an orientation pin located on the top of the core plate adjacent to the opening through which the apparatus is inserted into the reactor.

A traveler plate is movably coupled to the middle section of the apparatus. The traveler plate is located inside the middle section. A plurality of connecting bars extend between and are movably coupled to the traveler plate and a trunnion housing. The trunnion housing includes a hollow shaft that is configured to rotate. The scanner arm assembly is coupled to the rotatable shaft of the trunnion housing. The connecting bars are configured to move the scanner arm assembly from a position located inside the middle section to a position located outside the middle section and adjacent to the shroud support. The rotatable shaft of the trunnion housing permits the scanner arm assembly to be rotated from a vertical position to a horizontal position. In the vertical position, the scanner arm assembly may be stored inside the middle section of the apparatus. The horizontal position of the scanner arm assembly is the operating position of the arm for inspecting the shroud.

The middle section also includes a movable door configured so that when the door is moved to an open position, the scanner arm assembly may be moved by the connecting bars from a position located inside the middle section to a position outside the middle section. During insertion of the apparatus into, and extraction from the reactor, the scanner arm assembly is located inside the middle section and the movable door is typically in the closed position.

The lower section of the inspection apparatus is configured to engage a control rod drive housing of the reactor, and includes a rotating bearing that permits the apparatus to rotate about the longitudinal axis to align the plane of the trunnion radially in relation to the reactor in all placements of the apparatus within the reactor.

The scanner arm assembly includes an elongate fixed track coupled to the rotatable shaft of the trunnion housing, an elongate movable track movably coupled to the fixed track, and a scanner assembly movably coupled to the movable track. The scanner assembly includes a carriage movably coupled to the movable track and a scanner coupled to the carriage. A plurality of springs are located between the carriage and the scanner to spring load the scanner and keep the scanner in contact with the surface of the shroud when the scanner arm assembly is in the operating position adjacent the shroud. The scanner is typically an ultrasonic transducer array.

To scan the shroud, and more specifically, the shroud support and shroud welds, the scanner arm assembly is positioned inside the middle section of the inspection apparatus and the movable door is then moved to the closed position. In this configuration, the inspection apparatus will fit through the openings in the core plate.

The inspection apparatus is then manually lowered into the reactor pressure vessel through one of the openings in the core plate so that the second end of the lower section of the apparatus engages and rests on the control rod drive housing directly below the core plate opening. The apparatus is positioned so that the alignment lug engages the orientation pin located on the top of the core plate adjacent to the opening through which the apparatus is lowered into the reactor. The inspection apparatus is then rotated so that the scanner arm assembly is aligned properly in relation to the reactor shroud, and then the locking pin is moved to engage a slot in the indexing ring to lock the apparatus in the proper position. For convenience, the scanner arm may be pre-aligned with the locking pin engaging the appropriate slot in the indexing ring prior to inserting the apparatus into the reactor vessel.

The middle section movable door is opened, and the scanner arm assembly is moved to a position outside the middle section and adjacent the shroud. The scanner arm assembly is then rotated to a horizontal, or operating position with the ultrasonic transducers in contact with the shroud. The traveler plate is moved to the first end of the middle section to position the scanner to the initial, scan position.

Once the inspection apparatus is properly positioned, the scanner assembly scans the shroud. Particularly, in one embodiment, the movable track is moved to a first end of the fixed track while the scanner carriage is moved to a first end of the movable track. This positions the scanner to a location farthest from the center of the scanner arm assembly at the first end of the arm. The movable track is then moved between the first end to a second end of the fixed track which in turn causes the scanner to move from the first end to a second end of the movable arm thereby scanning along the entire length of the movable track travel. The traveler plate is then moved toward the second end of the middle section a predetermined distance. The movable track is then moved between the second end toward the first end of the fixed track which causes the scanner assembly to move between the second end and the first end of the movable track. This scan procedure is repeated until the traveler plate is adjacent the second end of the middle section. The scanner arm assembly is rotated to a vertical, or storage position and the connecting bars then move to position the scanner arm assembly inside the middle section. The movable door is closed, and the inspection apparatus may then be removed and repositioned to the next area to scan. The apparatus is reinstalled at the new position and another series of scans are performed as described above.

This scanning procedure is repeated until the area of interest or the entire shroud has been scanned. Upon completion of scanning, the inspection apparatus is removed from the reactor vessel. Specifically, the scanner arm assembly is rotated to the storing position and the connecting bars are moved to position the scanner arm assembly inside the middle section. The movable door is then closed and the apparatus is manually removed from the reactor pressure vessel. The resulting scan data is analyzed to determine any necessary maintenance activities.

The above described inspection apparatus is capable of performing ultrasonic examinations of a reactor shroud and shroud components, particularly shroud welds, from within the shroud cylinder. The inspection apparatus is configured to be lowered into the reactor through an existing opening in the core plate. Additionally, the position of the scanner array can easily be ascertained at any time because the inspection apparatus sits on a control rod housing of known height, and because the indexing ring engages a reference orientation pin on the core plate.

DETAILED DESCRIPTION

Figure 1:
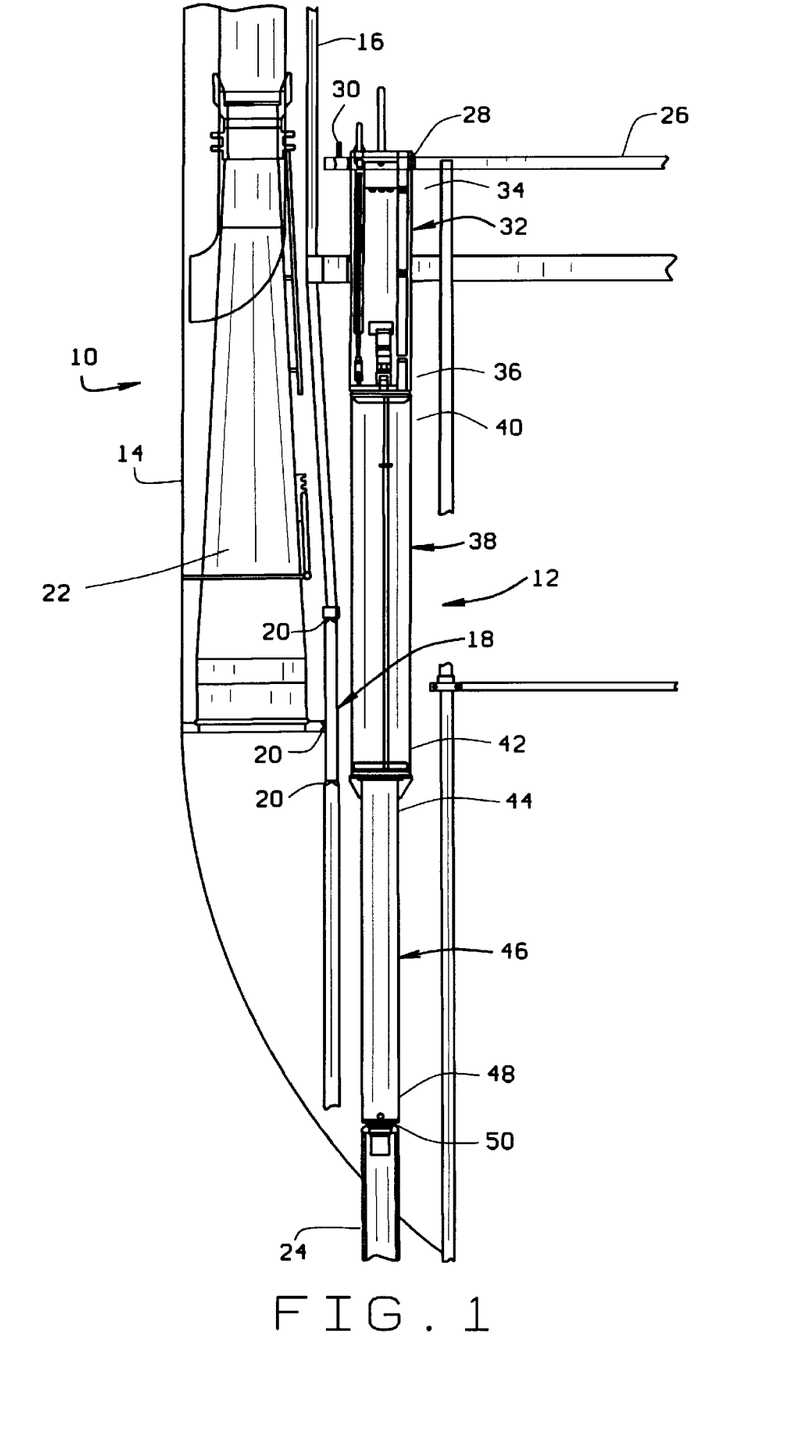
FIG. 1 is a cut away side view of a nuclear reactor pressure vessel illustrating an inspection apparatus in accordance with one embodiment of the present invention installed inside the shroud cylinder.

FIG. 1 is a cut away side view of a nuclear reactor pressure vessel 10 illustrating an inspection apparatus 12, in accordance with one embodiment of the present invention, installed inside RPV 10. Reactor pressure vessel 10 includes a vessel wall 14 and a shroud 16 attached to RPV wall 14 by a shroud support 18. Shroud 16 has a cylindrical shape and surrounds the core (not shown) of RPV 10. Shroud 16 includes a plurality of welds 20 joining the parts that form shroud 16. RPV 10 also includes a jet pump diffuser 22 coupled to shroud support 18. A control rod drive housing 24 extends through the bottom of RPV 10. Typically a RPV includes a plurality of control rod drives. A core plate 26 is located below the core (not shown) of RPV 10 and contains a plurality of openings 28 (one shown) through which the control rods (not shown) may extend. An orientation pin 30 is located on the top of core plate 26 adjacent to opening 28.

Inspection apparatus 12 extends through opening 28 in core plate 26 and engages, and is supported by control rod drive housing 24. Inspection apparatus 12 includes an upper section 32 having a first end 34 and a second end 36. A middle section 38 is coupled at a first end 40 to second end 36 of upper section 32. A second end 42 of middle section 38 is coupled to a first end 44 of lower section 46 of inspection apparatus 12. A second end 48 of lower section 46 is configured to engage control rod drive housing 24. Lower section 46 includes a rotary bearing 50 located at second end 48. Rotary bearing 50 is configured to permit inspection apparatus 12 to rotate axially.

Figure 2:
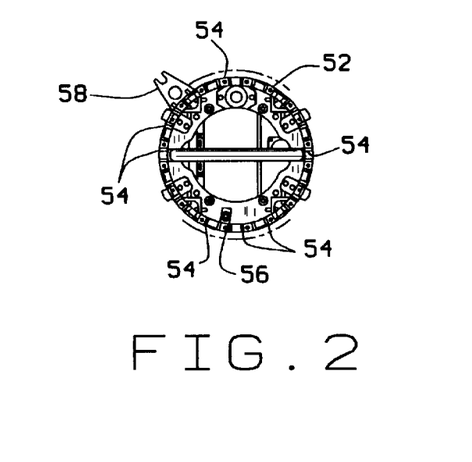
FIG. 2 is a top view with parts cut away of the upper section of the inspection apparatus illustrated in FIG. 1.
Figure 3:
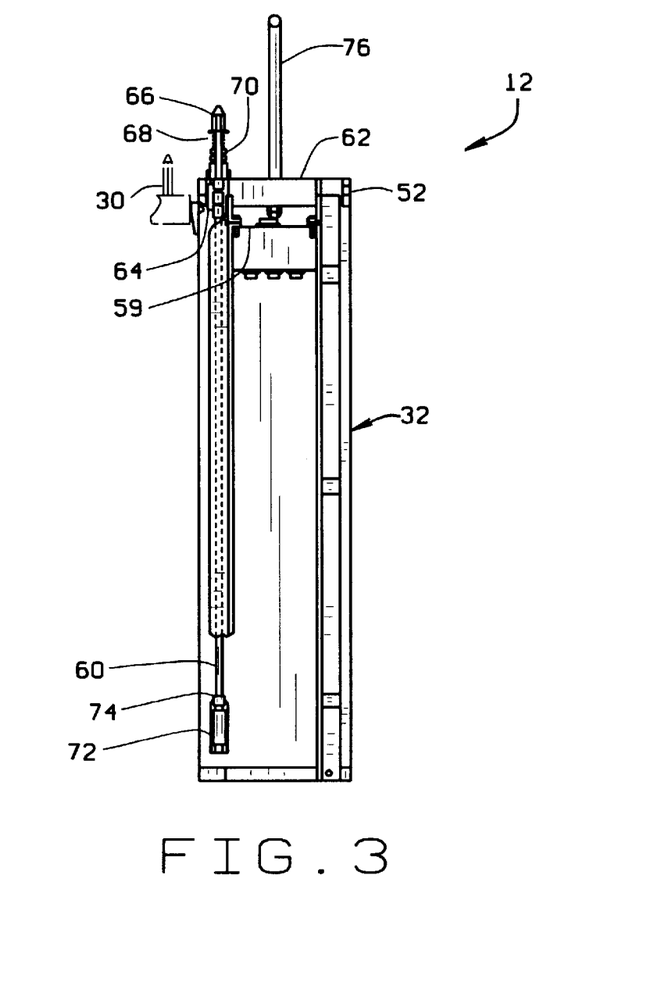
FIG. 3 is a side view with parts cut away of the upper section of the inspection apparatus illustrated in FIG. 1.

Referring to FIGS. 2 and 3, an indexing ring 52 is coupled to first end 34 of upper section 32 of inspection apparatus 12. Indexing ring 52 enables apparatus 12 to be orientated radially for all locations in RPV 10. Indexing ring 52 includes a plurality of slots 54 configured to receive a locking tab 56 for locking apparatus 12 in the proper orientation. Indexing ring 52 also includes an alignment lug 58 that is configured to engage orientation pin 30. Locking tab 56 is actuated by a fluid powered locking cylinder 59.

A shaft 60 extends from a top 62 of upper section 32 through a housing 64. A drive nut 66 is coupled to a top end 68 of shaft 60. A spring 70 is located adjacent drive nut 66 and engages top 62. A socket 72 is coupled to a bottom end 74 of shaft 60. Shaft 60 is configured to rotate about its longitudinal axis, move in a longitudinal direction through housing 64, and to be locked in place. A bail handle 76 is coupled to top 62.

Figure 4:
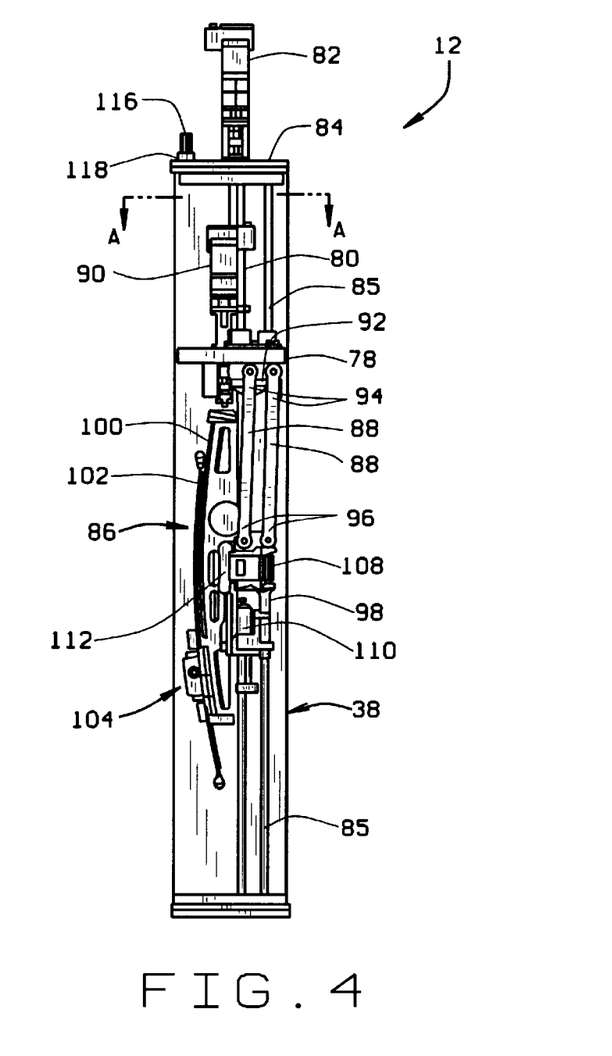
FIG. 4 is a side view with parts cut away of the middle section of the inspection apparatus illustrated in FIG. 1.
Figure 5:
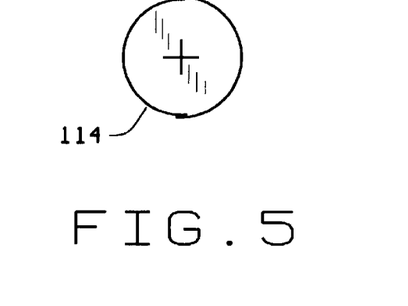
FIG. 5 is a cross section view through line A—A of the middle section illustrated in FIG. 4.

Referring to FIGS. 4 and 5, a traveler plate 78 is located inside middle section 38 of inspection apparatus 12. Traveler plate 78 is movably coupled to middle section 38. Particularly, traveler plate 78 is movably coupled to a ball screw 80 which is coupled to a drive motor 82. Drive motor 82 is coupled to top 84 of middle section 38. Three guide rods 85 (one shown) extend down from top 84 of middle section 38 and engage traveler plate 78. Guide rods 85 guide the vertical movement of traveler plate 78.

Inspection apparatus 12 also includes a scanner arm assembly 86 movably coupled to traveler plate 78. Particularly, four connecting bars 88 (two shown) are movably coupled at one end to traveler plate 78 and at an opposing end to scanner arm assembly 86 More particularly, traveler plate 78 includes a motor 90 coupled to a worm gear 92. Worm gear 92 is movably coupled to first ends 94 of connecting bars 88. Second ends 96 of connecting bars 88 are movably coupled to scanning arm assembly 86.

Scanning arm assembly 86 includes a trunnion housing 98, an elongate fixed track 100, an elongate movable track 102, and a scanner assembly 104. Trunnion housing 98 includes a shaft 108 configured to rotate. Fixed track 100 is coupled to rotatable shaft 108. Second ends 96 of connecting bars 88 are movably coupled to trunnion housing 98. A rotary actuator 110 is coupled to rotatable shaft 108 by a belt 112.

Movable track 102 is movably coupled to fixed track 100 and moves relative to fixed track 100. Scanner assembly 104 is movably coupled to movable track 102 and moves relative to movable track 102 in a dependent manner.

Middle section 38 also includes a movable door 114 (shown in FIG. 5). A hex shaft 116 is coupled to movable door 114 by a gear 118. When hex shaft 116 is rotated in a first direction, movable door 114 moves from a closed position to an open position. When hex shaft 116 is rotated in a second direction, movable door 114 moves from an open position to a closed position. Hex shaft 116 is configured to engage socket 72 (shown in FIG. 3).

Figure 6:
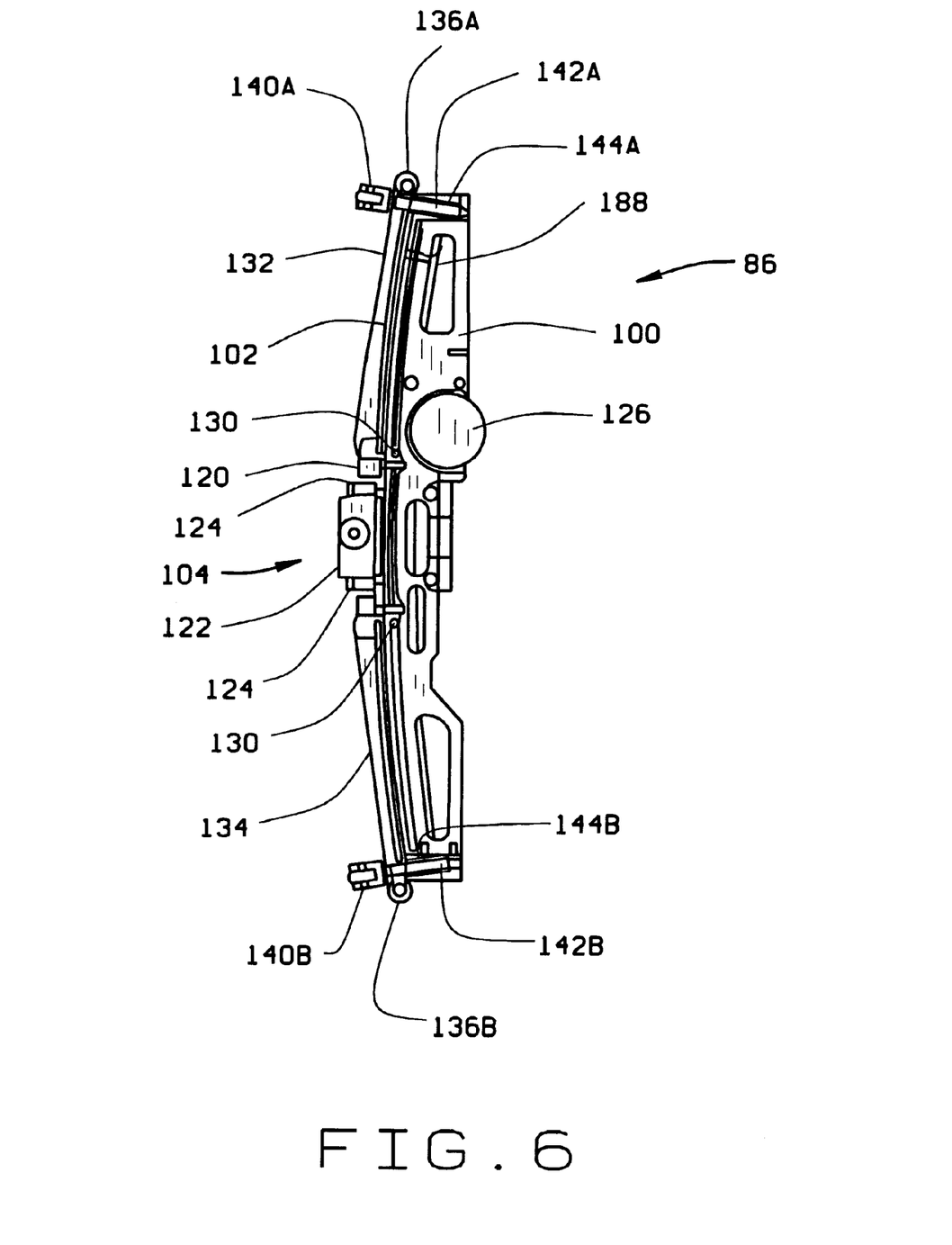
FIG. 6 is a top view of the scanner arm assembly shown in FIG. 4.

Referring to FIG. 6, scanner assembly 104 of scanner arm assembly 86 includes a movable carriage 120 movably coupled to movable track 102 and a scanner array 122 coupled to carriage 120 by springs 124. Springs 124 cause scanner array 122 to maintain contact with shroud support 18 during movement of movable track 102 and carriage 120. In one embodiment of the present invention, scanner array 122 is an ultrasonic transducer array.

Fixed track 100 of scanner arm assembly 86 includes a motor 126 coupled by a belt 128 to movable track 102. Movable carriage 120 is coupled to movable track 102 by rollers 130. A first auxiliary belt 132 extends between fixed track 100 and one end of carriage 120, and a second auxiliary belt 134 extends between fixed track 100 and an opposite end of carriage 120. Auxiliary belts 132 and 134 also extend around guide pulleys 136A and 136B coupled to opposing ends of movable track 102. The movement of belt 128 causes movable track 102 to move in relation to fixed track 100. The movement of track 102 together with first and second auxiliary belts 132 and 134, and guide rollers 136A and 136B causes carriage 120 to move along movable track 102 in the same direction as movable track 102. Particularly, as movable track 102 moves in a first direction, guide roller 136A causes auxiliary belt 132 to move in the same direction. Because auxiliary belt is of fixed length and fixedly attached to fixed track 100, the movement of auxiliary belt 132 causes carriage 120 to move in the same direction as movable track 102. Movable track 102 must be moving for carriage 120 to move. Fixed track 100 also includes rollers 140A and 140B coupled to the ends of track 100. Rollers 140A and 140B include shafts 142A and 142B respectively. Shafts 142A and 142B do not rotate, but are configured to move along their axis with the aid of springs 144A and 144B. Rollers 140A and 140B permit vertical movement of scanner arm assembly 86 while maintaining contact with shroud support 18.

Figure 7:
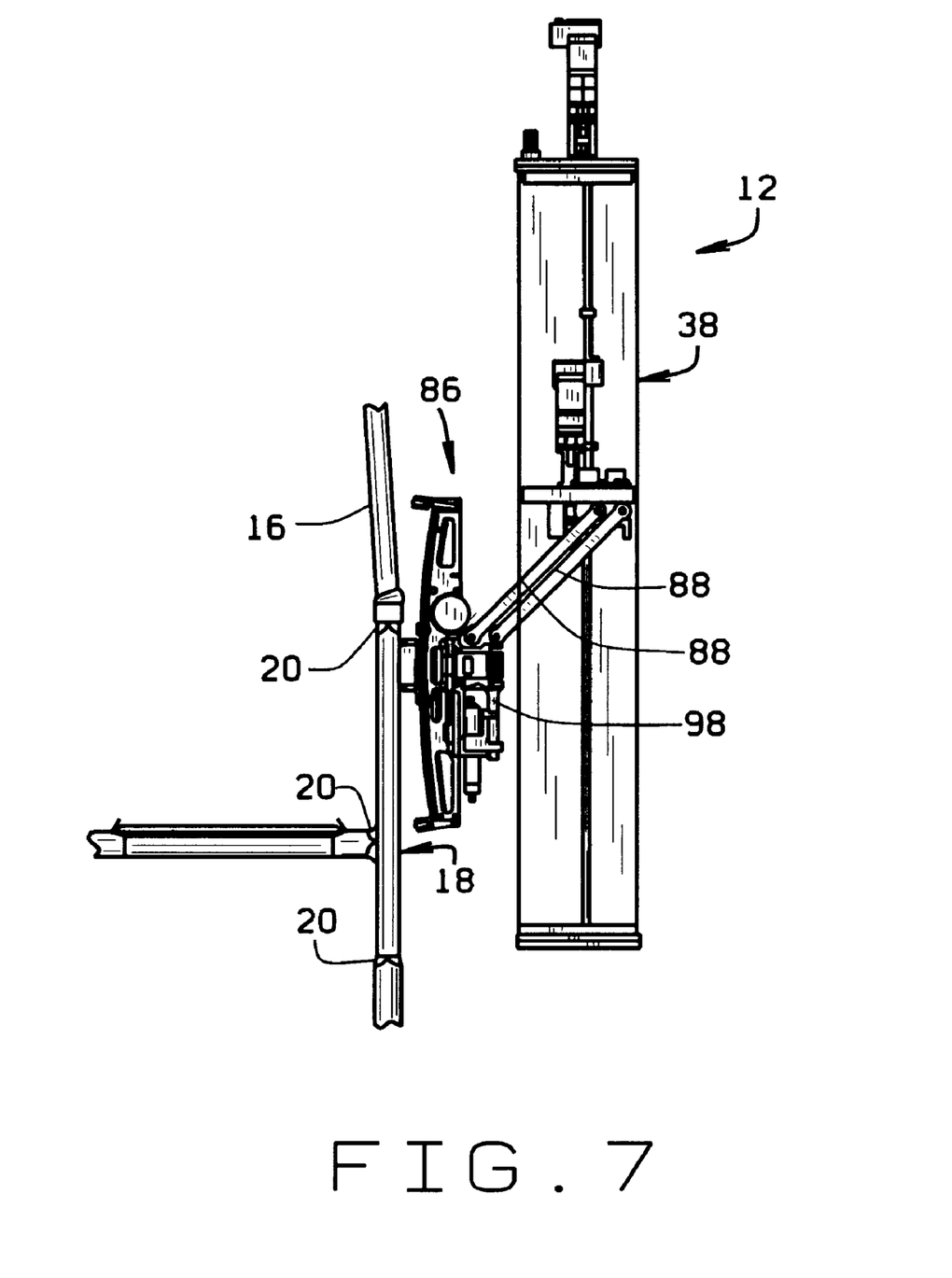
FIG. 7 is a side view with parts cut away of the middle section of the inspection apparatus shown in FIG. 1 illustrating the scanner arm assembly in a vertical position.

FIG. 7 is a side view with parts cut away of middle section 38 of inspection apparatus 12 illustrating the vertical position of scanner arm assembly 86 outside middle section 38 and adjacent shroud support 18. Connecting arms 88 maintains the attitude of trunnion housing 98 horizontal.

Figure 8:
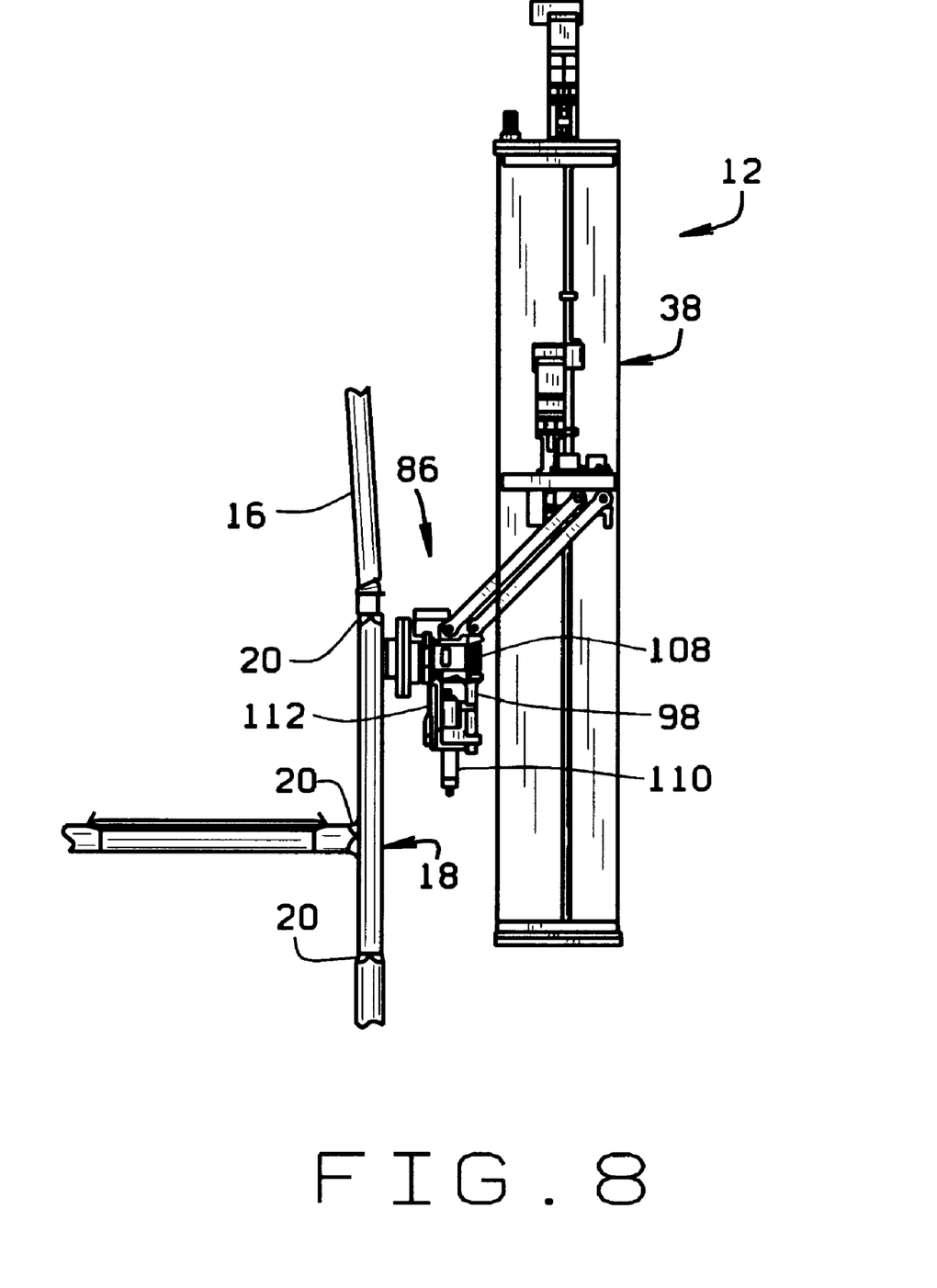
FIG. 8 is a side view with parts cut away of the middle section of the inspection apparatus shown in FIG. 1 illustrating the scanner arm assembly in a horizontal position.

FIG. 8 is a side view with parts cut away of middle section 38 of inspection apparatus 12 illustrating the horizontal position of scanner arm assembly 86 outside middle section 38 and adjacent shroud support 18. This view is similar to FIG. 7 except that trunnion shaft 108 has been rotated by rotary actuator 110 and belt 112 so that scanner arm assembly 86 is orientated in the horizontal position with scanner 122 adjacent shroud support 18.

To scan shroud 16, and more specifically, shroud support 18 and welds 20, scanner arm assembly 86 is positioned inside middle section 38 of inspection apparatus 12 with movable door 114 in the closed position. In this configuration, inspection apparatus 12 will fit through opening 28 in core plate 26.

Inspection apparatus 12 is then manually lowered by bail handle 76 into reactor pressure vessel 10 through opening 28 in core plate 26 so that end 48 of lower section 46 of apparatus 12 engages and rests on control rod drive housing 24 directly below core plate opening 28. Apparatus 12 is positioned so that alignment lug 58 engages orientation pin 30 located on the top of core plate 26 adjacent to opening 28. The inspection apparatus 12 is then rotated so that scanner arm assembly 86 is aligned properly in relation to reactor shroud 16, and then locking pin 56 is moved to engage slot 54 in indexing ring 52 to lock apparatus 12 in the proper position. For convenience, scanner arm 86 may be prealigned with locking pin 56 engaging the appropriate slot 54 in indexing ring 52 prior to inserting apparatus 12 into reactor vessel 10.

Middle section movable door 114 is opened, and scanner arm assembly 86 is moved to a position outside middle section 38 and adjacent shroud 16. Particularly, movable door 114 is opened by a tool (not shown) which engages drive nut 66. Shaft 60 is pushed downward so that socket 72 engages hex nut 116 coupled to movable door 114 by gear 118. Rotating drive nut 66 in a first direction causes gear 118 to rotate in the same direction and causes movable door 114 to move to an open position.

Motor 90 is then actuated causing worm gear 92 to rotate. The rotation of worm gear 92 causes connecting bars 88 to rotate radially out from middle section 38. This moves scanner arm assembly 86 to a position outside middle section 38. Next rotatable shaft 108 is rotated by rotary actuator 110 and belt 112. The rotation of shaft 108 causes scanner arm assembly 86 to rotated to a horizontal, or operating position with scanner 122 in contact with shroud support 18.

Traveler plate 78 is moved toward end 40 of middle section 38 to position scanner 122 in the initial scan position. Particularly, drive motor 82 rotates ball screw 80 in a first direction. The rotation of ball screw causes traveler plate 78 to move along guide rods 85 toward end 40 of middle section 38.

Once inspection apparatus 12 is properly positioned, scanner assembly 104 scans shroud support 18. Particularly, in one embodiment, movable track 102 is moved to one end of fixed track 100 while scanner carriage 120 is moved to the same end of movable track 102. This positions scanner 122 to a location farthest from the center of scanner arm assembly 86. Movable track 102 is then moved between opposing ends of fixed track 100 which in turn causes scanner 122 to move between opposing ends of movable track 102 thereby scanning along the entire length of movable track 102 travel. Traveler plate 78 is then moved toward end 42 of middle section 38 a predetermined distance. Movable track 102 is then moved between the opposing ends of fixed track 100 which causes scanner assembly 104 to move between the opposing ends of movable track 102. This scan procedure is repeated until traveler plate 78 is adjacent end 42 of middle section 38. Scanner arm assembly 86 is rotated to a vertical, or storage position and connecting bars 88 then move to position scanner arm assembly 86 inside middle section 38. Movable door 114 is closed, and inspection apparatus 12 may then be removed and repositioned to the next area to scan. Apparatus 12 is reinstalled at the new position and another series of scans are performed as described above.

This scanning procedure is repeated until the area of interest or the entire shroud 16 has been scanned. Upon completion of scanning, inspection apparatus 12 is removed from reactor vessel 10. Specifically, scanner arm assembly 86 is rotated to the storing position and connecting bars 88 are moved to position scanner arm assembly 86 inside middle section 38. Movable door 114 is then closed and apparatus 12 is manually removed from reactor pressure vessel 10. The resulting scan data is analyzed to determine any necessary maintenance activities.

The above described inspection apparatus 12 is capable of performing ultrasonic examinations of reactor shroud 16 and shroud components, particularly shroud support 18 and welds 20, from within the shroud cylinder. Inspection apparatus 12 is configured to be lowered into reactor 12 through an existing opening 28 in the core plate 26. Additionally, the position of scanner array 122 can easily be ascertained at any time because inspection apparatus 12 sits on control rod housing 24 of known height, and because indexing ring 52 engages reference orientation pin 30 on core plate 26.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

We claim:

1. An inspection apparatus for inspecting a shroud in a reactor pressure vessel of a nuclear reactor, the reactor pressure vessel having a core plate and a control rod drive housing, the core plate having a plurality of openings extending therethrough, said inspection apparatus configured to be inserted into the reactor pressure vessel through one of the openings in the core plate, and comprising:

an elongate tubular upper section having a first end and a second end;

an elongate tubular middle section coupled at a first end to said second end of said upper section;

an elongate tubular lower section having a first end and a second end, said first end coupled to a second end of said middle section, said lower section configured to engage the control rod drive housing at said second end;

a scanner arm assembly coupled to said middle section; and an indexing ring located at said first end of said upper section.

2. An apparatus in accordance with claim 1 wherein said indexing ring comprises a plurality of slots and a locking tab, said slots configured to receive said locking tab.

3. An apparatus in accordance with claim 2 wherein said indexing ring further comprises an alignment lug configured to engage an orientation pin located on top of the core plate adjacent to a core plate opening.

4. An apparatus in accordance with claim 1 wherein said lower section comprises a rotating bearing located at said second end of said lower section.

5. An apparatus in accordance with claim 1 wherein said middle section comprises a traveler plate movably coupled to said middle section, said traveler plate located inside said middle section.

6. An apparatus in accordance with claim 5 wherein said middle section further comprises a plurality of connecting bars movably coupled at a first end to said traveler plate and at a second end to said scanner arm assembly, said connecting bars configured to move said scanner arm assembly from a first position wherein said scanner arm assembly is located inside said middle section to a second position wherein said scanner arm assembly is located outside said middle section and adjacent to the shroud.

7. An apparatus in accordance with claim 1 wherein said middle section further comprises a movable door configured to permit said scanner arm assembly to move from a position located inside said middle section to a position located outside said middle section.

8. An apparatus in accordance with claim 1 wherein said scanner arm assembly comprises an elongate fixed track, an elongate movable track, and a scanner assembly, said movable track movably coupled to said fixed track, and said scanner movably coupled to said movable track.

9. An apparatus in accordance with claim 8 wherein said scanner assembly comprises a carriage movably coupled to said movable track, and a scanner coupled to said carriage.

10. An apparatus in accordance with claim 9 wherein said scanner comprises an ultrasonic transducer array.

11. An apparatus in accordance with claim 9 wherein said scanner assembly further comprises a plurality of springs located between said carriage and said scanner, said springs configured cause scanner to maintain contact with the shroud during movement of said movable track.

12. An apparatus in accordance with claim 8 wherein said scanner arm assembly further comprises a trunnion housing, said trunnion housing movably coupled to said connecting bars, and rotatably coupled to said fixed track.

13. A method for inspecting a shroud of a nuclear reactor pressure vessel using an inspection apparatus, the reactor pressure vessel having a core plate and a control rod drive housing, the core plate having a plurality of openings extending therethrough and an orientation pin adjacent each opening, the inspection apparatus including an elongate tubular upper section having a first end and a second end, an elongate tubular middle section coupled at a first end to the second end of the upper section, an elongate tubular lower section having a first end and a second end, the first end coupled to a second end of the middle section, the lower section configured to engage the control rod drive housing at the second end, and a scanner arm assembly movably coupled to the middle section, the inspection apparatus configured to be inserted into the reactor pressure vessel through one of the openings in the core plate, and to be axially rotatable, said method comprising the steps of:

installing the inspection apparatus in the reactor through one of the openings in the core plate of the reactor so that the second end of the lower section engages the control rod drive housing directly below the opening in the core plate, and an alignment lug, located at the first end of the upper section, engages the orientation pin adjacent the opening in the core plate; and     scanning the shroud with the inspection apparatus.

14. A method in accordance with claim 13 wherein installing the inspection apparatus in the reactor further comprising the steps of:

rotating the inspection apparatus so that the scanner arm assembly is aligned with the shroud;

moving the scanner arm assembly from a position located inside the middle section to a position located outside the middle section and adjacent to the reactor shroud; and     rotating the scanner arm assembly from a vertical position to a horizontal position.

15. A method in accordance with claim 13 wherein the scanner arm assembly comprises an elongate fixed track, an elongate movable track having a first and a second end, and a scanner assembly, the movable track movably coupled to the fixed track, and the scanner movably coupled to the movable track, and scanning the shroud comprises the step of moving the scanner assembly between the first and second ends of the movable track.

16. A method in accordance with claim 15 wherein scanning the shroud further comprises moving the scanner arm assembly between the first end of the middle section and the second end of the middle section.

17. An inspection apparatus for inspecting a shroud in a reactor pressure vessel of a nuclear reactor, the reactor pressure vessel having a core plate and a control rod drive housing, the core plate having a plurality of openings extending therethrough, said inspection apparatus comprising:

an elongate tubular assembly configured to extend through the core plate opening and to engage the control rod drive housing, said elongate assembly axially rotatable and comprising an indexing ring located at a first end; and     a scanner arm assembly movably coupled to said elongate assembly.

18. An apparatus in accordance with claim 17 wherein said elongate tubular assembly comprises:

an elongate tubular upper section having a first end and a second end;

an elongate tubular middle section coupled at a first end to said second end of said upper section; and     an elongate tubular lower section having a first end and a second end, said first end coupled to a second end of said middle section, said lower section configured to engage the control rod drive housing at said second end.

19. An apparatus in accordance with claim 18 wherein said upper section comprises said indexing ring located at said first end, said indexing ring comprising a plurality of slots, a locking tab, and an alignment lug, said slots configured to receive said locking tab, and said alignment lug configured to engage an orientation pin located on top of the core plate adjacent to a core plate opening.

20. An apparatus in accordance with claim 18 wherein said lower section comprises a rotating bearing located at said second end of said lower section.

21. An apparatus in accordance with claim 18 wherein said middle section further comprises a traveler plate movably coupled to said middle section and a plurality of connecting bars movably coupled at a first end to said traveler plate and at a second end to said scanner arm assembly, said connecting bars configured to move said scanner arm assembly from a first position inside said middle section to a second position outside said middle section and adjacent to the shroud.

22. An apparatus in accordance with claim 18 wherein said middle section further comprises a movable door configured to permit said scanner arm assembly to move from a position located inside said middle section to a position located outside said middle section.

23. An apparatus in accordance with claim 17 wherein said scanner arm assembly comprises an elongate fixed track, an elongate movable track, and a scanner assembly, said movable track movably coupled to said fixed track, and said scanner movably coupled to said movable track.

24. An apparatus in accordance with claim 23 wherein said scanner assembly comprises a carriage movably coupled to said movable track, and a scanner coupled to said carriage.

25. An apparatus in accordance with claim 24 wherein said scanner comprises an ultrasonic transducer array.

26. An apparatus in accordance with claim 24 wherein said scanner assembly further comprises a plurality of springs located between said carriage and said scanner, said springs configured cause scanner to maintain contact with the shroud during movement of said movable track.

27. An apparatus in accordance with claim 23 wherein said scanner arm assembly further comprises a trunnion housing, said trunnion housing movably coupled to said connecting bars, and rotatably coupled to said fixed track.

\* \* \* \* \*